G. A. HILLER.
DRAFT GEAR FOR TRAILERS.
APPLICATION FILED DEC. 12, 1918.
1,313,382.
Patented Aug. 19, 1919.
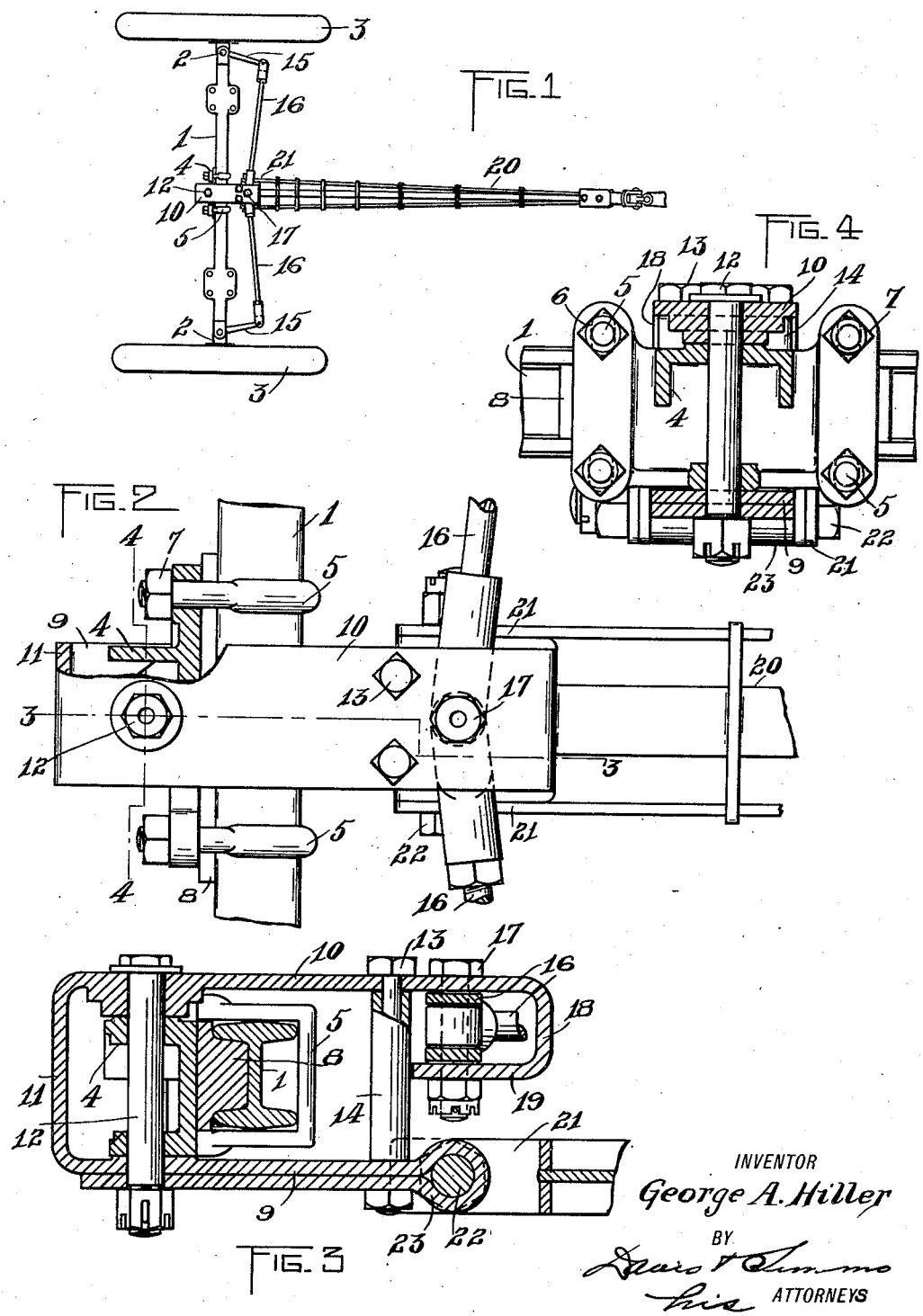
INVENTOR
George A. Hiller
BY
ATTORNEYS

UNITED STATES PATENT OFFICE.

GEORGE A. HILLER, OF EAST ROCHESTER, NEW YORK, ASSIGNOR TO KATE GLEASON, OF PITTSFORD, NEW YORK.

DRAFT-GEAR FOR TRAILERS.

1,313,382. Specification of Letters Patent. Patented Aug. 19, 1919.

Application filed December 12, 1918. Serial No. 266,483.

*To all whom it may concern:*

Be it known that I, GEORGE A. HILLER, a citizen of the United States, and resident of East Rochester, in the county of Monroe and State of New York, have invented certain new and useful Improvements in Draft-Gears for Trailers, of which the following is a specification.

The present invention relates to draft gears for trailers of the type in which a draft member is pivotally connected to a pivoted frame which, in turn, is connected to the wheel supporting spindles of the axle, and an object of the invention is to provide an improved pivoted frame between the draft member or bar and the axle of a vehicle having maximum strength, while at the same time giving lightness of structure. Another object of the invention is to provide for mounting the pivoted frame so that the strains will be imposed on the rear face of the axle and not upon the clips which secure the frame to the axle.

To this and other ends the invention consists of certain parts and combinations of parts, all of which will be hereinafter described, the novel features being pointed out in the appended claims.

In the drawings:—

Figure 1 is a plan view of a draft gear constructed in accordance with this invention;

Fig. 2 is an enlarged detail view of the draft gear partly in section;

Fig. 3 is a section on the line 3—3, Fig. 2; and

Fig. 4 is a section on the line 4—4, Fig. 2.

In the illustrated embodiment of the invention, there is employed an axle 1 which forms the forward axle of a trailer or other vehicle, this axle having at its ends pivoted spindles 2 on which the wheels 3 turn.

Preferably arranged in rear of the axle is a pivot block 4, which, in this instance, is attached to the axle 1 by two U-shaped clips 5 surrounding the axle and passing through openings 6 in the pivot block, the ends of the clips being secured by nuts 7, and a plate 8 being interposed, if desired, between the axle 1 and the pivot block. Mounted to turn on the pivot block is a frame which, in this instance, has two arms 9 and 10 connected together at 11, and also connected by a bolt or pivot pin 12 which extends through the arms, and through the pivot block 4. These arms may be further connected by two tie-bolts 13 arranged in front of the axle and surrounded by spacing sleeves 14 lying between the arms to hold them separated.

Connection may be established between this pivoted U-shaped frame and the pivoted axles 2, so that on the swinging of the frame the axles will be swung to cause the steering of the trailer. This connection, in this instance, embodies two arms 15, each extending forwardly from one of the spindles 2 and having connecting rods 16 pivotally secured to their forward ends, said rods also being pivotally connected to a common pivot pin 17 on the U-shaped pivoted frame. In this instance, the upper arm 10 of the U-shaped pivoted frame is deflected downwardly at 18, and rearwardly at 19, and the pivot pin 17 is secured in this rearwardly-extending porition 19, and that portion of the arm 10 above said rearwardly-extending portion 19.

Also connected to the pivoted frame is a draft bar 20, the construction of which does not enter into this application, but forms the subject matter of an application filed by me on even date herewith. This draft bar may be bifurcated at its inner end at 21, and have the arms of the bifurcations connected by a pivot pin 22, which turns in a sleeve 23 formed at the forward end of the arm 9, this sleeve preferably being made by bending the stock of which the arm 9 is made upon itself, and expanding the metal at the bend to form the sleeve, these two portions of the stock being riveted or otherwise permanently secured together. It is apparent that the pivot pin 22 permits the draft bar 20 to swing about a horizontal axis, whereas the pivot pin 12 permits the draft bar and the U-shaped frame to swing about a vertical axis. The swinging of the U-shaped frame about a vertical axis causes the turning of the wheel supporting spindles 2 on which the wheels 3 are mounted, this being effected through the connecting rods 16 and the arms 15 on the spindles.

From the foregoing it will be seen that the draft bar is connected to the axle through the medium of a pivoted frame, the pivot of which is in rear of the axle, while the frame has portions which extend above and below the axle, said portions preferably being connected in front of the axle to provide a rigid structure. In this way any strain on the frame is equally distributed on the pivot of the frame, and the pivot, in turn, is supported throughout its length by the axle, due to the fact that such pivot is arranged in rear of the axle. The pivot block on which the pivoted frame is mounted, is also arranged in rear of the axle, and in this way the strains on the block are taken up by the axle and not by the clips which secure the pivot block to the axle. The pivoted frame connects with the spindles of the wheels in front of the axle, thus permitting a low body to be mounted on the axle.

What I claim as my invention and desire to secure by Letters Patent is:—

1. A structure of the character described comprising an axle, wheel supporting spindles pivotally connected to the axle, a forwardly opening U-shaped frame pivotally mounted on the axle to turn about a vertical axis to receive the axle between its arms, a draft bar pivotally connected to one arm of the frame to swing about a horizontal axis, and connections between the other arm of the frame and the swinging spindles for turning the latter when the U-shaped frame is turned.

2. A structure of the character described comprising an axle, wheel supporting spindles pivotally mounted on the axle, a frame pivotally mounted to turn about an axis in rear of the axle and having portions extending over and under the axle and connected together in front of the axle, a draft bar pivotally connected to the pivoted frame to swing about a horizontal axis, and connections between said pivoted frame and the wheel supporting spindle, whereby the turning of the frame swings the wheel supporting spindles, said connections lying in front of the axle and being connected to the pivoted frame in front of the axle.

3. A structure of the class described comprising an axle, wheel supporting spindles pivotally connected to the axle, a pivot block secured in rear of the axle, a pivot pin extending through said block and projecting above and below the axle, a frame mounted on the projecting ends of the block and extending over and under the axle and also in front of the axle, a draft bar pivotally mounted on said frame to turn about a horizontal axis, and connection between said pivoted frame and the spindles for causing the swinging of the spindles with the turning of the pivoted frame, said connections lying in front of the axle and being connected to the pivoted frame in front of the axle.

4. A structure of the character described comprising an axle, spindles mounted to swing on the axle, a forwardly opening U-shaped frame pivotally mounted on the axle to turn about a vertical axis, a draft bar pivotally connected to one arm of the U-shaped frame to turn about a horizontal axis, and connections between the other arm of the U-shaped frame and the spindles.

5. A structure of the character described comprising an axle, spindles mounted on the axle, a pivot block arranged in rear of the axle, a U-shaped frame having a pivot pin turning in said pivot block in rear of the axle and having its arms extending forwardly above and below the axle, means for tying the arms together in front of the axle, a draft bar pivotally connected to one arm of the U-shaped frame, the other arm of said U-shaped frame being bent downwardly and rearwardly, a pivot bolt connecting said arms, connecting rods mounted upon said bolt, and forwardly extending arms on the spindles pivotally connected to the connecting rods.

GEORGE A. HILLER.